(12) United States Patent
Cizas et al.

(10) Patent No.: US 8,627,079 B2
(45) Date of Patent: Jan. 7, 2014

(54) METHOD AND SYSTEM FOR CONTROLLING A DEVICE

(75) Inventors: Jurijus Cizas, Castro Valley, CA (US); Shrinath Eswarahally, Sunnyvale, CA (US); Peter Laackmann, Munich (DE); Berndt Gammel, Markt-Schwaben (DE); Mark Stafford, San Carlos, CA (US); Joerg Borchert, Los Gatos, CA (US)

(73) Assignee: Infineon Technologies AG, Neubiberg (DE)

(*) Notice: Subject to any disclaimer, the term of this patent is extended or adjusted under 35 U.S.C. 154(b) by 1307 days.

(21) Appl. No.: 12/062,937

(22) Filed: Apr. 4, 2008

(65) Prior Publication Data

US 2009/0172401 A1    Jul. 2, 2009

Related U.S. Application Data

(60) Provisional application No. 60/984,534, filed on Nov. 1, 2007.

(51) Int. Cl.
  *G06F 21/00*  (2013.01)
(52) U.S. Cl.
  USPC .......................................................... 713/169
(58) Field of Classification Search
  None
  See application file for complete search history.

(56) References Cited

U.S. PATENT DOCUMENTS

| | | | |
|---|---|---|---|
| 5,455,863 A | 10/1995 | Brown et al. | |
| 5,552,776 A | 9/1996 | Wade et al. | |
| 5,628,028 A * | 5/1997 | Michelson | 710/8 |
| 5,686,904 A | 11/1997 | Bruwer | |
| 5,771,287 A | 6/1998 | Gilley et al. | |
| 5,862,339 A | 1/1999 | Bonnaure et al. | |
| 5,970,142 A | 10/1999 | Erickson | |
| 6,069,647 A * | 5/2000 | Sullivan et al. | 725/29 |
| 6,111,953 A | 8/2000 | Walker et al. | |
| RE36,946 E | 11/2000 | Diffie et al. | |
| 6,167,137 A | 12/2000 | Marino et al. | |
| 6,191,701 B1 | 2/2001 | Bruwer | |
| 6,209,091 B1 | 3/2001 | Sudia et al. | |
| 6,216,265 B1 | 4/2001 | Roop et al. | |
| 6,230,267 B1 | 5/2001 | Richards et al. | |
| 6,237,054 B1 | 5/2001 | Freitag, Jr. | |
| 6,259,908 B1 | 7/2001 | Austin | |
| 6,367,010 B1 | 4/2002 | Venkatram et al. | |
| 6,385,723 B1 | 5/2002 | Richards | |
| 6,386,451 B1 | 5/2002 | Sehr | |
| 6,393,564 B1 | 5/2002 | Kanemitsu et al. | |

(Continued)

FOREIGN PATENT DOCUMENTS

| | | |
|---|---|---|
| EP | 1170868 | 1/2002 |
| WO | 03034199 | 4/2003 |

OTHER PUBLICATIONS

Kean, Cryptographic Rights Management of FPGA Intellectual Property Cores, Paper, 7 pages, 2002.

(Continued)

*Primary Examiner* — David Pearson
(74) *Attorney, Agent, or Firm* — Dicke, Billig & Czaja, PLLC

(57) ABSTRACT

A system and method for controlling a device. Data that was encrypted using a first encryption scheme is decrypted, then re-encrypted using a second encryption scheme. The re-encrypted data is then decrypted.

29 Claims, 2 Drawing Sheets

(56) References Cited

U.S. PATENT DOCUMENTS

| | | | |
|---|---|---|---|
| 6,424,718 B1 | 7/2002 | Holloway | |
| 6,438,235 B2 | 8/2002 | Sims, III | |
| 6,457,125 B1* | 9/2002 | Matthews et al. | 713/160 |
| 6,460,023 B1 | 10/2002 | Bean et al. | |
| 6,496,928 B1 | 12/2002 | Deo et al. | |
| 6,560,665 B1 | 5/2003 | Resler et al. | |
| 6,565,000 B2 | 5/2003 | Sehr | |
| 6,587,842 B1 | 7/2003 | Watts | |
| 6,609,197 B1 | 8/2003 | Ketcham et al. | |
| 6,684,198 B1 | 1/2004 | Shimizu et al. | |
| 6,715,078 B1 | 3/2004 | Chasko et al. | |
| 6,769,060 B1 | 7/2004 | Dent et al. | |
| 6,810,406 B2 | 10/2004 | Schlabach et al. | |
| 6,836,805 B1 | 12/2004 | Cook | |
| 6,848,047 B1 | 1/2005 | Morikawa et al. | |
| 6,907,126 B2 | 6/2005 | Inada | |
| 6,915,434 B1 | 7/2005 | Kuroda et al. | |
| 7,014,120 B2 | 3/2006 | Al Amri | |
| 7,162,644 B1 | 1/2007 | Trimberger | |
| 7,203,842 B2 | 4/2007 | Kean | |
| 7,225,339 B2 | 5/2007 | Asano et al. | |
| 7,269,738 B1 | 9/2007 | Kivimaki | |
| 7,475,812 B1 | 1/2009 | Novozhenets et al. | |
| 7,546,455 B2 | 6/2009 | Kakii | |
| 7,590,860 B2 | 9/2009 | Leporini et al. | |
| 7,697,691 B2 | 4/2010 | Sutton, II et al. | |
| 7,757,294 B1 | 7/2010 | Simkins | |
| 7,783,884 B2 | 8/2010 | Nakano et al. | |
| 7,788,502 B1* | 8/2010 | Donlin et al. | 713/189 |
| 7,971,072 B1 | 6/2011 | Donlin et al. | |
| 8,065,517 B2 | 11/2011 | Cizas et al. | |
| 8,234,501 B2 | 7/2012 | Stafford et al. | |
| 2001/0016836 A1 | 8/2001 | Boccon-Gibod et al. | |
| 2001/0029581 A1 | 10/2001 | Knauft | |
| 2001/0032878 A1 | 10/2001 | Tsiounis et al. | |
| 2001/0037452 A1 | 11/2001 | Go et al. | |
| 2001/0037457 A1 | 11/2001 | Inada | |
| 2001/0037458 A1 | 11/2001 | Kean | |
| 2001/0056404 A1 | 12/2001 | Kuriya et al. | |
| 2002/0001386 A1 | 1/2002 | Akiyama | |
| 2002/0004784 A1 | 1/2002 | Forbes et al. | |
| 2002/0007454 A1 | 1/2002 | Tarpenning et al. | |
| 2002/0013898 A1 | 1/2002 | Sudia et al. | |
| 2002/0013940 A1 | 1/2002 | Tsukamoto et al. | |
| 2002/0023223 A1 | 2/2002 | Schmidt et al. | |
| 2002/0046175 A1 | 4/2002 | Bleumer | |
| 2002/0069361 A1 | 6/2002 | Watanabe et al. | |
| 2002/0114452 A1 | 8/2002 | Hamilton | |
| 2002/0114454 A1 | 8/2002 | Hamilton | |
| 2002/0118837 A1 | 8/2002 | Hamilton | |
| 2002/0150243 A1 | 10/2002 | Craft et al. | |
| 2002/0199110 A1 | 12/2002 | Kean | |
| 2003/0016826 A1 | 1/2003 | Asano et al. | |
| 2003/0016827 A1 | 1/2003 | Asano et al. | |
| 2003/0023858 A1 | 1/2003 | Banerjee et al. | |
| 2003/0051151 A1 | 3/2003 | Asano et al. | |
| 2003/0056107 A1 | 3/2003 | Cammack et al. | |
| 2003/0059051 A1 | 3/2003 | Hatano et al. | |
| 2003/0074564 A1 | 4/2003 | Peterson | |
| 2003/0086571 A1 | 5/2003 | Audebert et al. | |
| 2003/0095664 A1 | 5/2003 | Asano et al. | |
| 2003/0097558 A1 | 5/2003 | England et al. | |
| 2003/0120611 A1 | 6/2003 | Yoshino et al. | |
| 2003/0126430 A1 | 7/2003 | Shimada et al. | |
| 2003/0126450 A1 | 7/2003 | Master et al. | |
| 2003/0185396 A1 | 10/2003 | Asano et al. | |
| 2003/0221011 A1 | 11/2003 | Shitano | |
| 2004/0006713 A1 | 1/2004 | Minemura | |
| 2004/0030891 A1 | 2/2004 | Kurihara | |
| 2004/0030918 A1 | 2/2004 | Karamchedu et al. | |
| 2004/0086127 A1 | 5/2004 | Candelore | |
| 2004/0125402 A1 | 7/2004 | Kanai et al. | |
| 2004/0168063 A1 | 8/2004 | Revital et al. | |
| 2004/0247128 A1 | 12/2004 | Patariu et al. | |
| 2004/0247129 A1 | 12/2004 | Patariu et al. | |
| 2004/0259529 A1 | 12/2004 | Suzuki | |
| 2005/0021539 A1 | 1/2005 | Short et al. | |
| 2005/0049886 A1 | 3/2005 | Grannan et al. | |
| 2005/0071631 A1 | 3/2005 | Langer | |
| 2005/0123141 A1 | 6/2005 | Suzuki | |
| 2005/0149758 A1 | 7/2005 | Park | |
| 2005/0160476 A1 | 7/2005 | Kakii | |
| 2005/0172154 A1 | 8/2005 | Short et al. | |
| 2005/0195975 A1 | 9/2005 | Kawakita | |
| 2005/0228994 A1 | 10/2005 | Kasai et al. | |
| 2005/0240778 A1 | 10/2005 | Saito | |
| 2006/0018474 A1 | 1/2006 | Hori et al. | |
| 2006/0059368 A1 | 3/2006 | Fayad et al. | |
| 2006/0059369 A1 | 3/2006 | Fayad et al. | |
| 2006/0059372 A1 | 3/2006 | Fayar et al. | |
| 2006/0059373 A1 | 3/2006 | Fayad et al. | |
| 2006/0059574 A1 | 3/2006 | Fayad et al. | |
| 2006/0069737 A1 | 3/2006 | Gilhuly et al. | |
| 2006/0080464 A1 | 4/2006 | Kozuki | |
| 2006/0107059 A1 | 5/2006 | Lewis et al. | |
| 2006/0116890 A1 | 6/2006 | Nakamura et al. | |
| 2006/0155990 A1 | 7/2006 | Katsube et al. | |
| 2006/0177064 A1 | 8/2006 | Holtzman et al. | |
| 2006/0182282 A1 | 8/2006 | Negahdar | |
| 2006/0191009 A1 | 8/2006 | Ito et al. | |
| 2006/0242465 A1 | 10/2006 | Cruzado et al. | |
| 2006/0242696 A1 | 10/2006 | Cruzado et al. | |
| 2006/0259965 A1 | 11/2006 | Chen | |
| 2006/0265603 A1* | 11/2006 | McLean et al. | 713/189 |
| 2006/0277414 A1 | 12/2006 | Kotani et al. | |
| 2007/0030974 A1 | 2/2007 | Ishibashi et al. | |
| 2007/0043978 A1 | 2/2007 | Cruzado et al. | |
| 2007/0044158 A1 | 2/2007 | Cruzado et al. | |
| 2007/0074045 A1 | 3/2007 | Van Essen et al. | |
| 2007/0101157 A1 | 5/2007 | Faria | |
| 2007/0101434 A1 | 5/2007 | Jevans | |
| 2007/0124603 A1 | 5/2007 | Yamamichi et al. | |
| 2007/0130294 A1 | 6/2007 | Nishio | |
| 2007/0168676 A1* | 7/2007 | Fayad et al. | 713/185 |
| 2007/0200661 A1 | 8/2007 | Blum | |
| 2007/0204170 A1 | 8/2007 | Oren et al. | |
| 2007/0250649 A1 | 10/2007 | Hickey et al. | |
| 2007/0263872 A1 | 11/2007 | Kirkup et al. | |
| 2007/0266247 A1 | 11/2007 | Kirkup et al. | |
| 2007/0274520 A1 | 11/2007 | Ogata | |
| 2007/0274525 A1 | 11/2007 | Takata et al. | |
| 2007/0276765 A1 | 11/2007 | Hazel et al. | |
| 2007/0282749 A1 | 12/2007 | Nonaka et al. | |
| 2007/0283151 A1 | 12/2007 | Nakano et al. | |
| 2008/0010449 A1 | 1/2008 | Holtzman et al. | |
| 2008/0010450 A1 | 1/2008 | Holtzman et al. | |
| 2008/0010451 A1 | 1/2008 | Holtzman et al. | |
| 2008/0010452 A1 | 1/2008 | Holtzman et al. | |
| 2008/0010455 A1 | 1/2008 | Holtzman et al. | |
| 2008/0010458 A1 | 1/2008 | Holtzman et al. | |
| 2008/0022395 A1 | 1/2008 | Holtzman et al. | |
| 2008/0040284 A1 | 2/2008 | Hazel et al. | |
| 2008/0044029 A1 | 2/2008 | Gilhuly et al. | |
| 2008/0046528 A1 | 2/2008 | Gilhuly et al. | |
| 2008/0046529 A1 | 2/2008 | Gilhuly et al. | |
| 2008/0101613 A1 | 5/2008 | Brunts et al. | |
| 2008/0155260 A1 | 6/2008 | Perez et al. | |
| 2008/0186052 A1 | 8/2008 | Needham et al. | |
| 2008/0209012 A1 | 8/2008 | Abujbara et al. | |
| 2008/0219449 A1 | 9/2008 | Ball et al. | |
| 2008/0260155 A1 | 10/2008 | Kasahara et al. | |
| 2008/0263224 A1 | 10/2008 | Gilhuly et al. | |
| 2008/0282087 A1* | 11/2008 | Stollon et al. | 713/171 |
| 2008/0288410 A1 | 11/2008 | Nino | |
| 2008/0319823 A1 | 12/2008 | Ahn et al. | |
| 2009/0116650 A1 | 5/2009 | Cizas et al. | |
| 2009/0144526 A1 | 6/2009 | Cizas et al. | |
| 2009/0144553 A1 | 6/2009 | Stafford et al. | |
| 2009/0172392 A1 | 7/2009 | Cizas et al. | |
| 2009/0274297 A1 | 11/2009 | Cho et al. | |
| 2009/0276627 A1 | 11/2009 | Cho et al. | |
| 2010/0017599 A1 | 1/2010 | Sellars et al. | |
| 2010/0031026 A1 | 2/2010 | Cizas et al. | |

(56) References Cited

U.S. PATENT DOCUMENTS

| | | |
|---|---|---|
| 2010/0088515 A1 | 4/2010 | Nishimoto et al. |
| 2010/0235624 A1 | 9/2010 | Candelore |
| 2011/0176675 A1 | 7/2011 | Hughes et al. |

OTHER PUBLICATIONS

Simpson et al., Offline HW/SW Authentication for Reconfigurable Platforms, Paper, 13 pages, 2006.

European Search Report for European Patent Application No. EP 08 01 9115.8 dated Mar. 10, 2009 (6 pages).

Menezes et al., "Handbook of Applied Cryptography: Ch. 10 Identification and Entity Authentication," (Jan. 1, 1997), pp. 400-405, XP002143934 ISBN: 978-0-8493-8523-0.

Communication for European Patent Application No. EP 08 019 115.8 dated Dec. 2, 2009. (4 pgs.).

B. Schneier, "Applied Cryptography, Second Edition, Protocols, Algorithms, and Source Code in C: Ch. 24 Example Implementations," (Jan. 1, 1996), pp. 574-577, XP002922914 ISBN: 978-0-471-11709-4.

Office Action for U.S. Appl. No. 11/948,952 mailed Dec. 10, 2010 (17 pgs.).

Final Office Action for U.S. Appl. No. 11/948,952 mailed May 26, 2011 (15 pgs.).

Examiner Interview Summary for U.S. Appl. No. 11/948,952 mailed Jul. 26, 2011 (3 pgs.).

Office Action for U.S. Appl. No. 11/948,952 mailed Aug. 9, 2011 (14 pgs.).

Final Office Action for U.S. Appl. No. 11/948,952 mailed Jan. 18, 2012 (19 pgs.).

Notice of Allowance for U.S. Appl. No. 11/948,952 mailed Mar. 30, 2012 (5 pgs.).

Office Action for U.S. Appl. No. 11/948,962 mailed Aug. 20, 2009 (12 pgs.).

Final Office Action for U.S. Appl. No. 11/948,962 mailed Feb. 2, 2010 (11 pgs.).

Advisory Action for U.S. Appl. No. 11/948,962 mailed Apr. 15, 2010 (3 pgs.).

Office Action for U.S. Appl. No. 11/948,962 mailed Mar. 28, 2011 (9 pgs.).

Office Action for U.S. Appl. No. 12/062,961 mailed Jan. 24, 2012 (19 pgs.).

Final Office Action for U.S. Appl. No. 12/062,961 mailed Jun. 15, 2012 (18 pgs.).

Office Action for U.S. Appl. No. 12/062,961 mailed Aug. 21, 2012 (19 pgs.).

Office Action for U.S. Appl. No. 12/062,961 mailed Dec. 13, 2012 (13 pgs.).

Final Office Action for U.S. Appl. No. 12/062,961 mailed Apr. 9, 2013 (24 pgs.).

Advisory Action for U.S. Appl. No. 12/062,961 mailed Jul. 19, 2013 (3 pgs.).

Office Action for U.S. Appl. No. 12/062,987 mailed Dec. 28, 2011 (36 pgs.).

Office Action for U.S. Appl. No. 12/098,011 mailed Jan. 19, 2011 (25 pgs.).

Notice of Allowance for U.S. Appl. No. 12/098,011 mailed Jun. 30, 2011 (5 pgs.).

Schneier, B, "Applied Cryptography, Protocols, Algorithms, and Source Code in C," Applied Cryptography, Second Edition, XP-002121376, pp. 53-54, (Jan. 1, 1996).

\* cited by examiner

METHOD AND SYSTEM FOR CONTROLLING A DEVICE

CROSS-REFERENCE TO RELATED APPLICATIONS

This application claims the benefit of U.S. Provisional Application No. 60/984,534, filed on Nov. 1, 2007, which is incorporated by reference. This application is related to U.S. patent application Ser. No. 12/062,961, "METHOD AND SYSTEM FOR TRANSFERRING INFORMATION TO A DEVICE"; U.S. patent application Ser. No. 12/062,987, "METHOD AND SYSTEM FOR TRANSFERRING INFORMATION TO A DEVICE"; and U.S. patent application Ser. No. 12/098,011, "METHOD AND SYSTEM FOR TRANSFERRING INFORMATION TO A DEVICE"; all filed the same day as the present application and all incorporated by reference.

BACKGROUND

Various electronic devices provide characteristics that can be changed after production, including digital signal processors (DSP), field programmable gate arrays (FPGA), etc. For example, an FPGA is an integrated circuit device containing programmable logic components sometimes referred to as "logic blocks," and programmable interconnects. Logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memories. The logic blocks and interconnects can be programmed after the FPGA is manufactured ("field programmable") to implement the desired functions.

Such devices may have a trustworthiness that is limited due to a lack of a root of trust at the start of the device lifecycle and throughout the subsequent lifecycle stages. Encryption is typically disabled in reconfigurable logic devices such as FPGAs when the FPGAs are manufactured. FPGA system integrators or equipment manufacturers have to enable encryption and program the encryption key into the FPGA. Accordingly, monitoring functions or audit mechanisms are lacking. The manufacturing environment is inherently insecure and can be prone to attacks.

For these and other reasons, there is a need for the present invention.

SUMMARY

Embodiments of a system and method for controlling a device are disclosed. Data that was encrypted using a first encryption scheme is decrypted, then re-encrypted using a second encryption scheme. The re-encrypted data is then decrypted.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
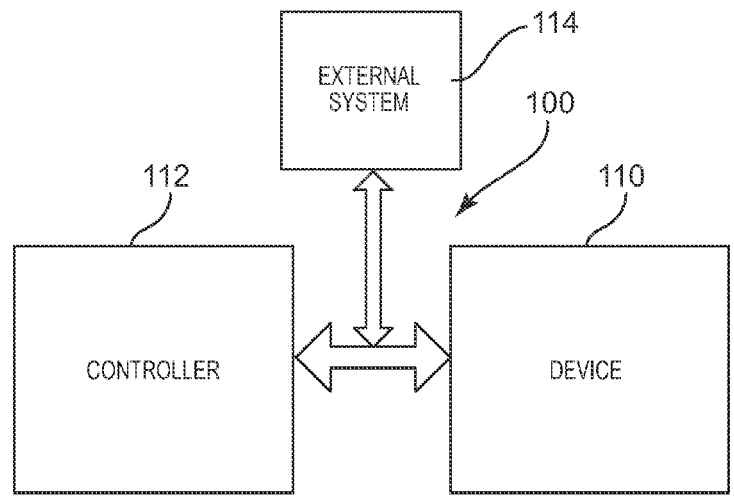
FIG. 1 is a block diagram conceptually illustrating aspects of a device.

FIG. 1 is block diagram conceptually illustrating aspects of a device 100. In one embodiment, the device 100 is a integrated circuit device. Many types of integrated circuit devices have characteristics or programs that can be changed or require updating after production, such as various microprocessors or microcontrollers, digital signal processors (DSP), field programmable gate arrays (FPGA), etc.

Certain integrated circuit devices, such as FPGAs, may require updating or upgrading. The embodiments of the system 100 illustrated in FIG. 1 include a device 110 that may require such upgrading. A controller 112 is coupled to the device 110 and provides a trusted core for reconfiguring or upgrading aspects of the device 110, which is especially useful when the system 100 is deployed in an untrusted environment. The controller 112 communicates with and controls the configuration and operation of the device 110. In some embodiments, multiple devices are associated with a single controller 112, though in FIG. 1 and subsequent figures a single device 110 is illustrated for sake of simplicity. The terms "coupled," "connected," along with derivatives and other similar terms are meant to indicate that the relevant elements cooperate or interact with each other regardless of whether they are in direct physical or electrical contact.

The provision of the controller 112 enables trusted changes and upgrades for devices 110 on an individual basis. The controller 112 and the device 110 can be implemented on a single die or on multiple die in a suitable package such as a multi-chip module.

Figure 2:
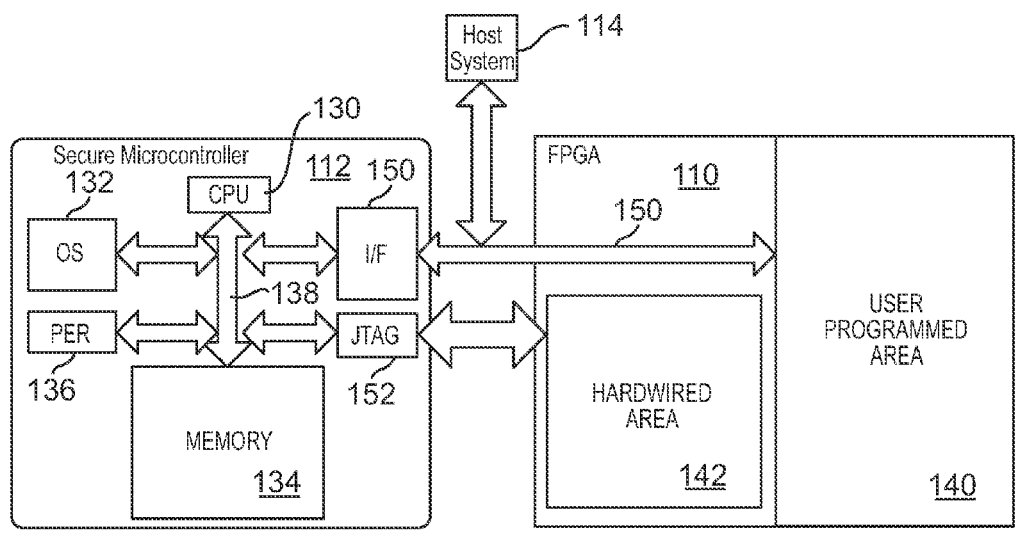
FIG. 2 is a block diagram conceptually illustrating aspects an embodiment of a FPGA system.

FIG. 2 illustrates aspects of an embodiment where the device 110 is a field programmable gate array (FPGA). In other embodiments, the device 110 could include other types of integrated circuit devices. In FIG. 2, information for programming or upgrading the device 110 is controlled by the secure microcontroller 112. Examples of suitable secure microcontrollers include a model SLE88CFX4002P microcontroller available from Infineon Technologies AG. The secure microcontroller 112 supports the secure operation of individual processes, enables convenient use for secure applications and allows secure encapsulation of a running process from other processes. For example, the secure microcontroller 112 provides execution of applications in compliance with specific trust criteria for different linked libraries. Specific features can include memory management and the provision of secure firewalls between security-sensitive partitions in an application.

Example embodiments of the secure microcontroller 112 include a central processing unit (CPU) 130 and memories such as ROM, RAM, Flash, etc. An operating system 132 is stored in a ROM, and a secure memory 134 is included in the illustrated embodiment. The secure microcontroller 112 also includes peripherals 136, such as a random number generator, interrupt module, crypto coprocessor, DES accelerator, UART, configurable internal control oscillator, and a suitable number of timers such as three timers. The CPU 130, operating system 132, secure memory 134, peripherals 136, and one or more interfaces (JTAG, USB, PCMCIA, ISO 7816, etc.) are coupled together via a bus system 138. The example secure microcontroller illustrated in FIG. 2 includes a first interface 150, such as an ISO7816 standard smartcard interface, and a second interface 152 such as a JTAG interface.

Figure 3:
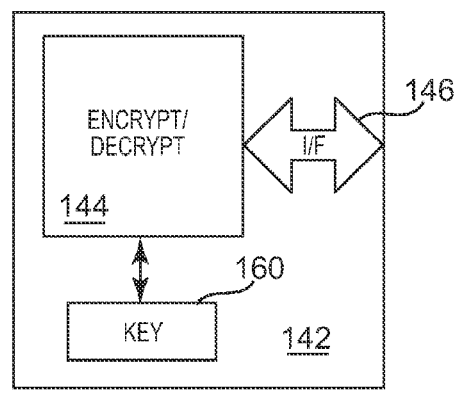
FIG. 3 illustrates aspects of the system of FIG. 2.

The FPGA 110 includes a user programmable area 140 and secure storage, such as a hardwired area 142. A secure microcontroller interface 150 is connectable to the corresponding interface in the secure microcontroller 112 via an appropriate link. FIG. 3 illustrates further aspects of the hardwired area 142 of the FPGA 110. An encryption/decryption engine 144 and a programming interface 146 are provided in the hardwired area 142, among other things. The hardwired area 142 further includes a JTAG interface 152 connected to the JTAG interface 152 of the secure microcontroller 112.

The secure microcontroller 112 generates and stores one or more keys 160 in exemplary embodiments. In this disclosure, a "key" is intended to include one or more keys and can refer to any suitable data that can be used to control access to the relevant device. In certain embodiments, the format of the key is compatible with a symmetrical cryptography algorithm, such as the Advanced Encryption Standard (AES) or the Triple Data Encryption Standard (TDES). In other embodiments, the key includes a block of any suitable predetermined data or random data. For example, an FPGA programming key 160 is stored in the secure memory 134 of the secure microcontroller 112. The FPGA programming key 160 is further stored in the hardwired area 142 of the FPGA 110 in some embodiments.

To program or reconfigure the FPGA 110, a secure or trusted communication channel is established between the external system 114 and the secure microcontroller 112 via mutual authentication. In the system of FIG. 2, the external system is an external host system. After establishing a communication channel via the interface 150 of the secure microcontroller 112, the host 114 sends encrypted data, such as an encrypted image, to the FPGA system 100. More specifically, the encrypted data are sent to the secure microcontroller 112 of the FPGA system 100 in exemplary embodiments. The data sent from the host 114 to the secure microcontroller 112 is encrypted using a first encryption scheme, for example, an asymmetric encryption scheme. In embodiments where the first encryption scheme is an asymmetric scheme, the decrypting the data includes using a private key of the secure microcontroller 112.

The secure microcontroller 112 decrypts the encrypted image received from the host 114, and then re-encrypts the data using the FPGA key 160. In certain embodiments, the data is re-encrypted using a second encryption scheme, such as a symmetric encryption scheme wherein the FPGA key 160 would be a symmetric key. In other embodiments, the first encryption scheme is a symmetric encryption scheme and the second encryption scheme is an asymmetric encryption scheme. In still further embodiments, both the first and second encryption schemes are asymmetric, or both the first and second encryption schemes are symmetric encryption schemes.

In the embodiment illustrated in FIG. 2, the re-encrypted data is sent to the FPGA encryption/decryption engine 144 via the JTAG interface 152. In one embodiment, the image is received by the secure microcontroller in small pieces of data, or records. The decryption engine 144 decrypts the encrypted data using the key 160 stored in the secure memory 134 and/or within the hardwired area 142 of the FPGA 110.

The decrypted data can then be used to program the device 110. For example, the decrypted data is used to reconfigure desired portions of the FPGA 110 in certain embodiments. Further, the secure microcontroller 112 can be programmed to create a digital signature or CRC using the configuration data. The digital signature or CRC can be stored in the secure microcontroller 112, for example, in the secure memory 134. The next time the FPGA 110 is reconfigured, the digital signature or CRC may be verified by the secure microcontroller 112. The digital signature ensures the integrity of the FPGA image and ensures that the device has not been reconfigured during the intervening period. In response to verifying the signature, the FPGA 110 is programmed. If the digital signature cannot be verified, the secure microcontroller 112 can report back to the host system 114 that the trust level of the system 100 has been changed. In this situation, the host 114 can decide whether to complete the reconfiguration.

The secure microcontroller 112 can control the reconfiguration of any suitable number of logic cells in the FPGA 110, the reconfiguration of two or more FPGAs 110, or the reconfiguration of two or more partitions within an FPGA 110.

Figure 4:
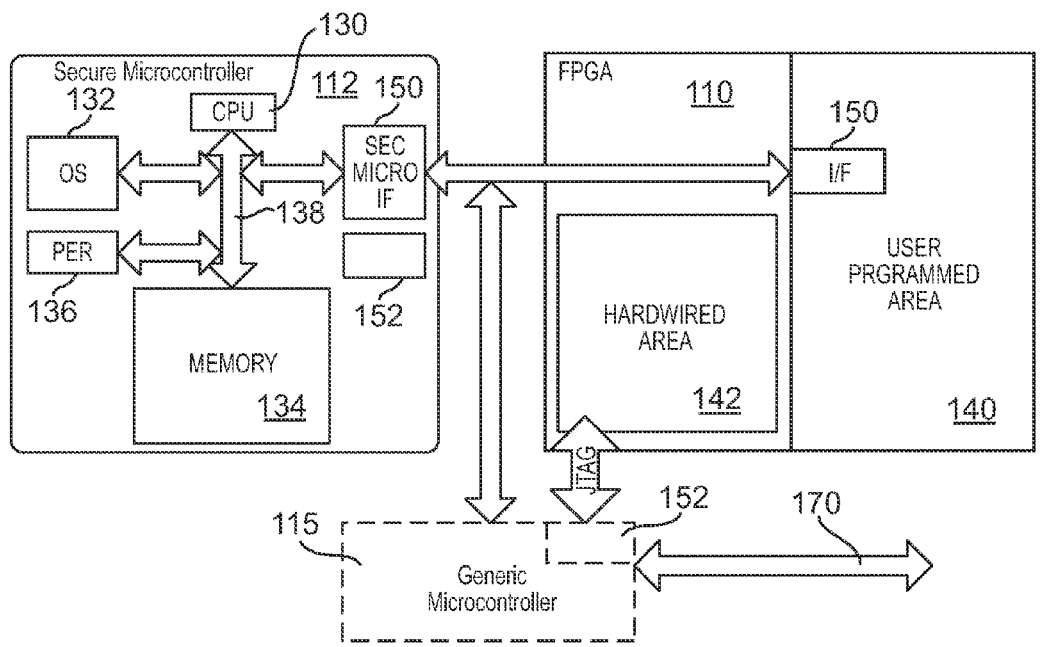
FIG. 4 is a block diagram conceptually illustrating aspects of another embodiment of a FPGA system.

FIG. 4 illustrates another embodiment where the external system 114 includes a generic microcontroller 115, which includes an external interface 170 for coupling to an external host or other system as desired. In FIG. 4, the programming, updating, etc. is controlled through the generic microcontroller 115. The secure microcontroller 112 of the embodiment illustrated in FIG. 4 is similar to that illustrated in FIG. 2, but it does not include a JTAG interface. Instead, the generic microcontroller 115 has a JTAG interface 152 that is connectable to the corresponding interface of the FPGA 110.

Accordingly, the trusted communication channel is established between the external host 114, through the generic microcontroller 115, and the secure microcontroller 112 via mutual authentication. The generic microcontroller 115 forwards the encrypted data, or image from an external system connected to the interface 170, to the secure microcontroller 112.

In some embodiments, the FPGA 110 does not include the secure storage 142. If the FPGA 110 uses volatile memory, such as an SRAM FPGA, to store programming code, the programming code needs to be loaded into the FPGA 110 each time the FPGA 110 is powered up. In this case, the microcontroller 112 stores the programming code in the secure memory 134, and securely transfers the programming code to the FPGA 110 in the manner disclosed above when it is powered up.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for controlling a device, comprising:
   providing a controller having a processor, a memory, and a first interface;

providing a programmable device having a user programmed area and a hardwired area, the user programmed area coupled to the first interface, the hardwired area coupled to a second interface;
providing a generic controller directly connected to the first interface and the second interface;
receiving data that was encrypted using a first encryption scheme via the first interface;
decrypting the data that was encrypted using a first encryption scheme by the controller;
re-encrypting the data using a second encryption scheme by the controller;
sending the re-encrypted data from the controller to the generic controller via the first interface;
sending the re-encrypted data from the generic controller to the hardwired area of the programmable device via the second interface of the controller; and
decrypting the re-encrypted data by a decryption engine in the hardwired area of the programmable device.

2. The method of claim 1, further comprising:
sending the re-encrypted data to a plurality or the programmable devices.

3. The method of claim 1, wherein the re-encrypted data are sent to the hardwired area of the programmable device on each start-up of the programmable device.

4. The method of claim 1, further comprising storing the data within the memory of the controller.

5. The method of claim 1, further comprising:
programming the user programmed area of the programmable device using the data.

6. The method of claim 1, wherein the first encryption scheme is an asymmetric encryption scheme and the second encryption scheme is a symmetric encryption scheme.

7. The method of claim 6, wherein decrypting the data comprises using a private key, and wherein re-encrypting the data comprises using a symmetric key that is stored in the memory of the controller.

8. The method of claim 6, wherein decrypting the data comprises using a private key stored in the memory of the controller, and wherein re-encrypting the data comprises using one or more symmetric keys stored in the memory of the controller and a memory in the hardwired area of the programmable device.

9. The method of claim 1, wherein the first encryption scheme is a symmetric encryption scheme and the second encryption scheme is an asymmetric encryption scheme.

10. The method of claim 1, wherein the first and second encryption schemes are symmetric encryption schemes.

11. The method of claim 1, wherein the first and second encryption schemes are asymmetric encryption schemes.

12. The method of claim 1, further comprising:
establishing a secure communications channel between the hardwired area of the device and an external system.

13. The method of claim 12, wherein establishing a secure communications channel includes authentication between the device and the external system.

14. The method of claim 1, further comprising:
verifying a digital signature of the data.

15. The method of claim 14, further comprising:
programming the device in response to verifying the digital signature.

16. The method of claim 14, further comprising:
storing the data and/or the digital signature in the memory of the controller.

17. The method of claim 1, wherein receiving the encrypted data comprises receiving a plurality of records.

18. The method of claim 1, wherein sending the re-encrypted data to the programmable device comprises sending the re-encrypted data via the second interface of the controller that is a JTAG interface.

19. A system, comprising:
a programmable device including a user programmed area coupled to a first interface, and a hardwired area having a decryption engine and a memory, the hardwired area coupled to a second interface; and
a controller coupled to the user programmed area of the programmable device via the first interface and coupled to the hardwired area of the programmable device via the second interface, the controller having a processor, and a memory, the first interface configured to receive data that was encrypted using a first encryption scheme;
a generic controller coupled to the controller and the user programmed area of the programmable device via the first interface;
wherein the controller is configured to decrypt the data that was encrypted using the first encryption scheme, re-encrypt the data using a second encryption scheme, and send the re-encrypted data to the hardwired area of the programmable device via the generic controller and the second interface.

20. The system of claim 19, wherein the controller memory is configured to store one or more keys corresponding to the first encryption scheme and/or the second encryption scheme.

21. The system of claim 19, wherein the programmable device comprises two or more programmable devices, and wherein the memory of each one of the two or more programmable devices is configured to store one or more keys.

22. The system of claim 19, wherein the first encryption scheme is an asymmetric encryption scheme and the second encryption scheme is a symmetric encryption scheme.

23. The system of claim 19, wherein the first encryption scheme is a symmetric encryption scheme and the second encryption scheme is an asymmetric encryption scheme.

24. The system of claim 19, wherein the first and second encryption schemes are symmetric encryption schemes.

25. The system of claim 19, wherein the first and second encryption schemes are asymmetric encryption schemes.

26. The system of claim 19, wherein the memory of the programmable device is configured to store one or more keys corresponding to the second encryption scheme.

27. The system of claim 19, wherein the decryption engine decrypts the re-encrypted data, and wherein the decrypted data is used to reconfigure one or more portions of the user programmed area of the programmable device.

28. A secure FPGA system, comprising:
a FPGA device including a user programmed area, and a hardwired area having a decryption engine and a memory; and
a secure microcontroller coupled to the FPGA, wherein the secure microcontroller includes a processor, a memory, an external interface connecting the secure microcontroller to the user programmed area and to an external system, and a JTAG interface connecting the secure microcontroller to the hardwired area, and wherein:
the secure microcontroller is programmed to decrypt encrypted information received from the external system via the external interface using a first encryption scheme with a first key stored in the memory of the secure microcontroller, re-encrypt the information using a second encryption scheme with a second key stored in the memory of the secure microcontroller, and send the re-encrypted information to the hardwired area of the FPGA via the JTAG interface; and the decryption engine of the FPGA is programmed to decrypt the re-encrypted information using the second key stored in the memory of the hardwire area, and program the user programmed area of the FPGA using the decrypted with the second key.

29. The secure FPGA system of claim 28, wherein the first encryption scheme is an asymmetric encryption scheme and the second encryption scheme is a symmetric encryption scheme.

* * * * *